United States Patent
Bahamdain

(10) Patent No.: US 9,166,459 B1
(45) Date of Patent: Oct. 20, 2015

(54) GRAVITATIONAL ENERGY POWERED GENERATOR

(71) Applicant: Omar Bahamdain, Melbourne, FL (US)

(72) Inventor: Omar Bahamdain, Melbourne, FL (US)

( * ) Notice: Subject to any disclaimer, the term of this patent is extended or adjusted under 35 U.S.C. 154(b) by 8 days.

(21) Appl. No.: 14/226,203

(22) Filed: Mar. 26, 2014

(51) Int. Cl.
 *F03G 3/00* (2006.01)
 *H02K 7/18* (2006.01)

(52) U.S. Cl.
 CPC .............. *H02K 7/1853* (2013.01); *F03G 3/00* (2013.01)

(58) Field of Classification Search
 CPC ........ H02K 7/1853; H02K 53/00; F03G 3/02; F03G 3/00; F03G 7/10; F03B 17/04; F03B 9/00
 USPC .......................................................... 290/1 R
 See application file for complete search history.

(56) References Cited

U.S. PATENT DOCUMENTS

| | | | | |
|---|---|---|---|---|
| 4,326,132 A | * | 4/1982 | Bokel | 290/1 R |
| 5,125,233 A | * | 6/1992 | Evanger et al. | 60/496 |
| 5,430,333 A | * | 7/1995 | Binford et al. | 290/54 |
| 5,944,480 A | * | 8/1999 | Forrest | 415/5 |
| 6,249,057 B1 | * | 6/2001 | Lehet | 290/1 R |
| 7,573,147 B2 | | 8/2009 | Karim | |
| 8,011,182 B2 | | 9/2011 | Hastings | |
| 8,089,167 B2 | * | 1/2012 | Alvite | 290/1 C |
| 8,516,812 B2 | * | 8/2013 | Manakkattupadeettathil | 60/495 |
| 2008/0303285 A1 | * | 12/2008 | Bondhus | 290/54 |
| 2009/0127866 A1 | * | 5/2009 | Cook | 290/1 R |
| 2009/0309373 A1 | * | 12/2009 | O'Briant | 290/1 R |
| 2010/0001537 A1 | * | 1/2010 | Galvez Thiange | 290/1 R |
| 2010/0307149 A1 | * | 12/2010 | Kwok | 60/496 |
| 2011/0012369 A1 | * | 1/2011 | Grossman | 290/1 R |
| 2011/0162356 A1 | * | 7/2011 | Hastings | 60/495 |
| 2012/0074713 A1 | | 3/2012 | Dorozenski et al. | |
| 2014/0284938 A1 | * | 9/2014 | Xu | 290/1 R |

* cited by examiner

*Primary Examiner* — Tulsidas C Patel
*Assistant Examiner* — Viet Nguyen
(74) *Attorney, Agent, or Firm* — Oblon, McClelland, Maier & Neustadt, L.L.P.

(57) ABSTRACT

A gravitational energy powered generator that includes an inflatable container configured to move vertically up and down a track via one or more connectors from the inflatable container. A number of valves to insert or extract gas or liquid from the inflatable container are included as well as a power generating component that either connects to the container itself or the belt with the containers connected to it. The gravitational energy powered generator thereby produces power generated via kinetic movement of the container along the track.

12 Claims, 13 Drawing Sheets

US 9,166,459 B1

GRAVITATIONAL ENERGY POWERED GENERATOR

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

Energy production has been one of the most crucial industries since the industrial age. There has been a drive to produce more energy quickly, efficiently and cost effectively. Recently there is an ever growing drive to produce energy more environmentally friendly hence the rapid production of wind and installation of wind turbines and solar panels around the world easing the dependence on coal, fossil and nuclear produced energy.

Environmentally friendly generated energy, also known as green energy or renewable energy has become essential to the way energy is now being produced. As generating power is expensive, requires fossil fuels damaging to environment governments and researchers around the world are consistently looking for new ways to produce cleaner and greener energy to achieve global targets of reducing the levels of $CO^2$ emissions currently affecting our environment.

SUMMARY

According to an embodiment, there is provided a gravitational energy powered generator that includes an inflatable and deflatable container constructed to receive a gas or liquid substance through an entry valve and a support tower like structure with a track to guide the inflatable and deflatable container. The track contains support mechanisms to assist with the gas insertion and extraction at different points on the track, and an electricity generator uses the movement of the inflatable and deflatable container to generate electricity.

According to another embodiment, there is also provided a configuration of connecting multiple inflatable and deflatable containers to a single tower.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and the exemplary depictions do not in any way limit the scope of the advancements embraced by the specification. The scope of the advancements embraced by the specification and drawings are defined by the words of the accompanying claims.

DETAILED DESCRIPTION OF THE EMBODIMENTS

Figure 1:
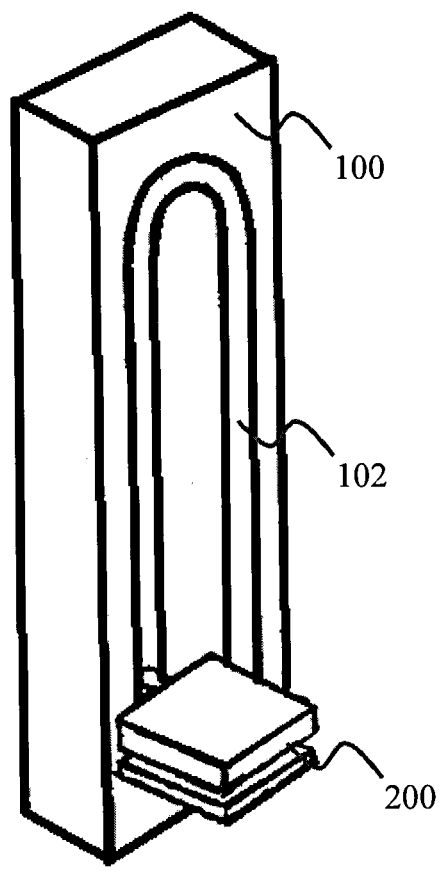
FIG. 1 is an illustration of the gravitational energy powered generator according to an exemplary embodiment.

New innovative methods of generating power are in demand as there is a push to diversify energy sources around the world. In selected embodiments, components are connected together and configured to move in order to produce electricity, the components encompass one or more parts such as an inflatable/deflatable container, a track for guiding the container, a tower or support for the track and other internal components for the apparatus and a valve system for enabling gas or liquid enter and exit the container.

The gravitational energy powered generator, or simply "generator," uses the force of gravity to aid the movements of the inflatable container. In selected embodiments, the generator can therefore function without the aid of any electrical components assisting it and can be configured to automatically function by setting up the mechanical components. It is designed to be versatile in the sense that it can be configured in several ways and it is not limited to the shape or size of the container or the construction of the track and support. All components can be of any size, shape or weight necessary to fulfill the overall objectives for the embodiment, as long as the components can function in the manor they are supposed to.

The gravitational energy powered generator uses a method of filling an inflatable container with a substance that is lighter than the environment outside of the container causing the container to rise upwards. When the container reaches the highest point of the guidance track a mechanism triggers the valve to release the substance from the container causing it to deflate. The weight of the deflated container will cause it to drop downwards to the ground with the force of gravity, when the container reaches the bottom of the track a mechanism is triggered and the substance refills the container.

Accordingly, in selected embodiments, the gravitational energy powered generator provides a method of power generation that is fully mechanical based that does not necessarily rely on an electrical controller to operate the mechanisms. It can be easy to construct and is not limited at size or weight. In other selected embodiments, an electrical controller may be provided to operate various mechanisms.

Referring now to the drawings, wherein like reference numerals designate identical or corresponding parts throughout several views.

FIG. 1 illustrates the generator 10 according to one example. The generatore includes a tower 100 to which all the components are attached, a track 102 included in the tower 100 and made to guide an inflatable/deflatable container 200 around the tower 100. In selected embodiments, the track is an opening in the tower 100 itself or a recessed groove within the tower 100. The inflatable container 200 fills with a gas or liquid substance that is lighter than the weight of the environment outside of it which causes the container 200 to move upwards. The container 200 may be filled with gas or liquid via a valve port (not shown) connected to a gas cylinder (not shown) having the specific gas. The gas can be any gas, such as helium, that is lighter than a surrounding environment in which the generator 10 is located. Further, the container 200 can be made of a light material such as wood or aluminum or other lightweight material as would be understood by one of ordinary skill in the art thereby allowing the gas or liquid to have a great effect.

At the top of the tower 100, at a peak 101 of the track 102, the container 200 is deflated (as described further herein) and falls down the other side of the track. Within selected embodiments the gas cylinder that captures the gas or liquid that exits the inflatable container 200 also releases gas or liquid into the inflating container 200. The gas cylinder that captures the gas or liquid can be made of a flexible material that is able to expand beyond it's set size when the pressure within the container 200 exceeds a threshold.

Figures 2A, 2B:
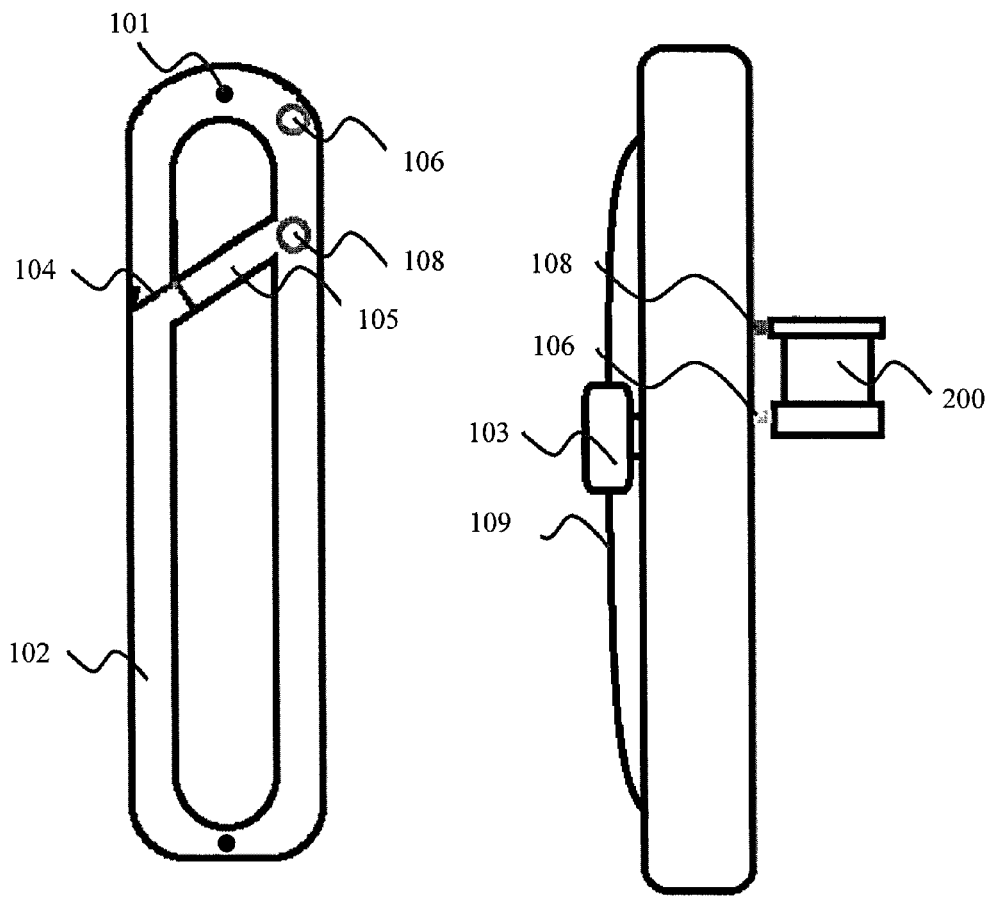
FIGS. 2A and 2B show a front and side perspective of the gravitational energy powered generator according to one example.

FIG. 2A illustrates a front perspective of the apparatus with a track design and moving components within it according to one example. The track 102 can be circular or elliptical shaped with a diagonal track 105 from one side to the other and guides the container 200 or a plurality of containers 200 via one or more connecting components 106, 108 that have the ability to add or extract the contents of the container. The connecting components 106, 108 connected to the inflatable container 200 guide the container as it moves along the track 102. As stated previously, the container 200 rises along the track 102 of the tower 100 due to the type of gas located within the container 200. The two connecting components 106 and 108 are guided along the track 102 and switch positions depending on whether the inflatable container 200 is moving upwards or downwards. A track guide 104 guides the components 106, 108 when the container reaches at or near the peak 101 of the support tower 100. Thus, the track guide 104 guides one connecter 108 that connects a lighter surface of the inflatable container 200 through a diagonal route between the diagonal track 105. It also enables the second connector 106 to continue moving upwards to the top of the tower 100 thereby enabling the container 200 to rotate.

FIG. 2B is an exemplary illustration of a side view of the apparatus showing the tower 100, the inflatable container 200 and a gas cylinder 103 with two connecting tubes 109. One of the connecting tubes 109 connects to the upper end of the tower 100 for receiving gas from the inflatable container 200 and another connecting tube 109 connects to the lower end of the tower 100 for providing gas to the inflatable container 200. In the exemplary illustration FIG. 2B the gas cylinder 103 is positioned outside of the tower 100, but in selected embodiments the gas cylinder 103 can be positioned inside the tower 100, on the side of the tower 100, on top of the tower 100 or any location providing the tubes 109 are connected to the upper and lower positions on the tower 100. An alternative configuration is to not have the cylinder at all and connect a single tube 109 directly from the top to the bottom of the positions of the tower 100.

Figure 3A:
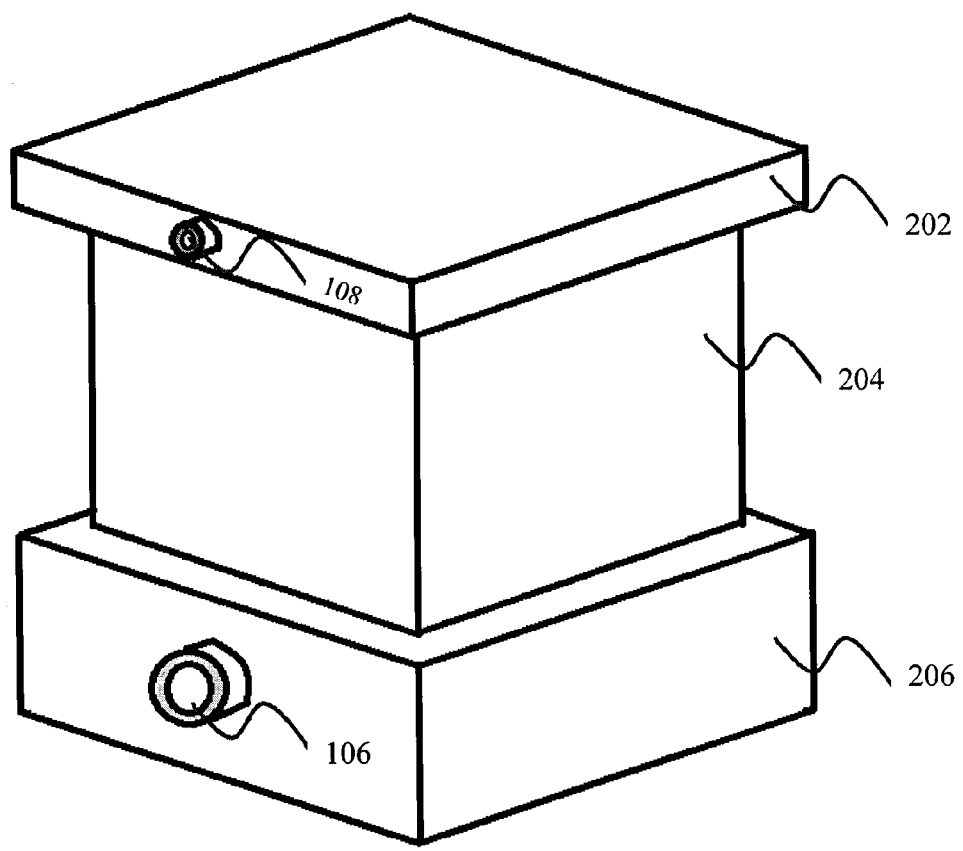
FIG. 3A illustrates the inflatable container according to one example.

FIG. 3A illustrates the inflatable container 200 having a number of components 106, 108 and two surfaces 202 and 206. The surfaces are also identified herein as portions or housings of the container 200. In selected embodiments, the surface 202 is constructed in a fashion such that it is lighter than the surface 206 of the inflatable container 200. Connecting the two surfaces 202, 206 is a durable fabric 204 that can fold under pressure, the selected embodiment can be made of a number of materials such as maylar, nylon, plastic etc. as would be understood by ordinary skill in the art. Also placed within the two surfaces 202,206 are the guide connectors 108 and 106, respectively. The guide connectors 108 and 106 can be connected to the tower via a conveyer belt located within the tower 100 and conforming to the shape of the track 102. Alternatively, the guide connectors can be designed to be larger than an opening in the tower 100 provided by the track 102 such that they will not fall out of the track 102 when moving. In selected embodiments, the connector 106 and/or 108 also function as a valve allowing gas or liquid enter and exit the container 200. The design for this mechanism allows the container 200 to inflate when gas or liquid inside of the container is lighter than the environment outside of it. When the container 200 inflates (due to insertion of gas or liquid) it raises upwards to generate power. FIGS. 4A to 4H show a step by step illustration of the movements carried out by the inflatable container.

Figure 3B:
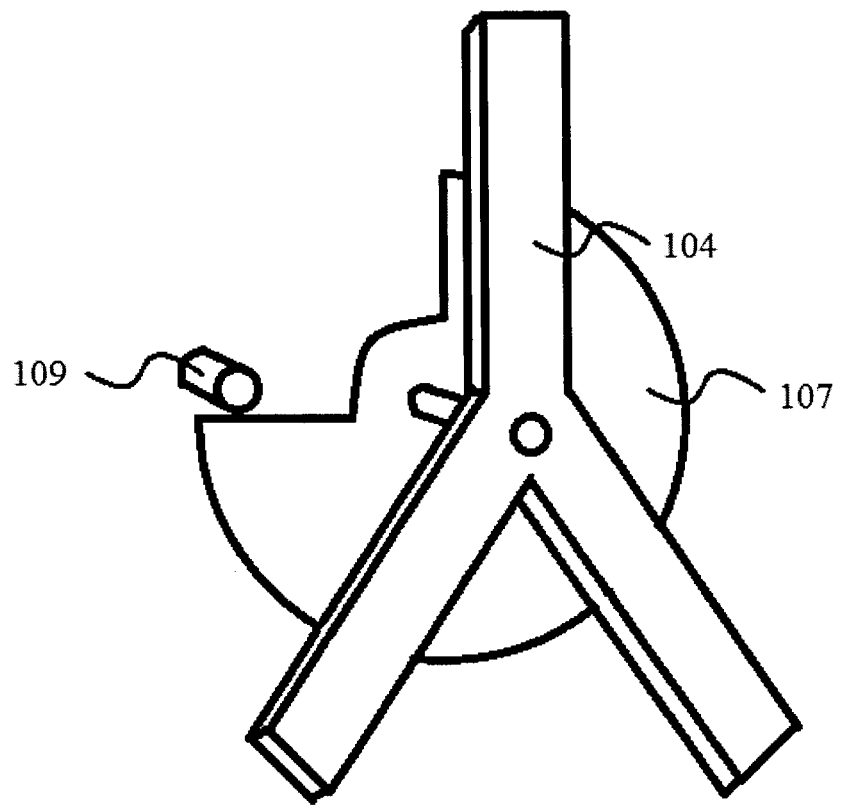
FIG. 3B illustrates a track guide component according to one example.

FIG. 3B illustrates an exemplary configuration for the track guide component 104 that guides the inflatable container connecting components 106, 108 to either the diagonal track 105 or upwards to the peak of the tower 101. The guide component 104 is shaped with three ends with a center rod shaped component that can be place through a support on the tower 100. The opposite end of the rod is connected to the center of circular component 107. In selected embodiments, the circular component 107 has one quarter of the shape removed making the circular component have only 270 degrees of the complete circle although a different portion is contemplated in alternative embodiments. The purpose of the circular component is to restrict the circular movement of component 104 to only 90 degrees. The movement is stopped by a pivot component 109 that blocks the continuation of the circular movement of the component 104.

Figure 3C:
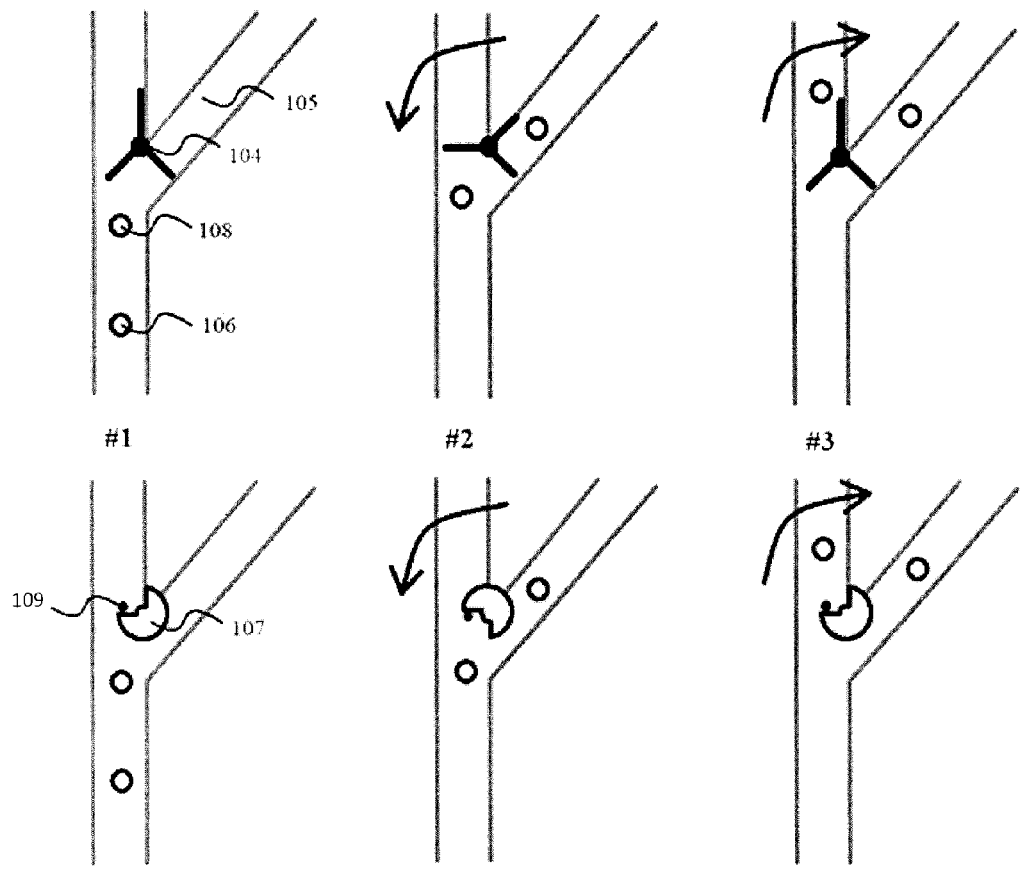
FIG. 3C illustrates the movements of the inflatable container via connecting components and the track guide component 104 according to one example.

FIG. 3C illustrates the movements of the inflatable container 200 illustrated by the connecting components 108, 106 and the route guide component 104 with the circular component 107 and pivot 109. In Step #1, the connecting component 108 comes into contact with the component guide component 104 and cannot proceed in an upward direction as the circular component cannot be moved due to a restriction by the pivot 109. Accordingly, the component 108 is directed towards the diagonal track 105 due to the pivot 109 blocking the rotation movement of the circular component 107 that is connected to the guide track guide component 104. In step #2 of FIG. 3C the connecting component 108 moves along to track 105 pushing the track guide component 104 causing it to rotate 90 degrees and then be blocked again by the pivot 109. In step #3 the second connecting component 106 passes the track guide component 104 and cannot proceed along track 105 as the circular component movement is restricted due to pivot 109. Therefore, the component 106 is guided along upwards to towards peak 101 thereby causing the circular component to rotate back allowing the connecting component 106 to move upwards. The track guide component 104 is returned back to its original position ready to repeat the process again.

Figures 4A, 4B, 4C, 4D:
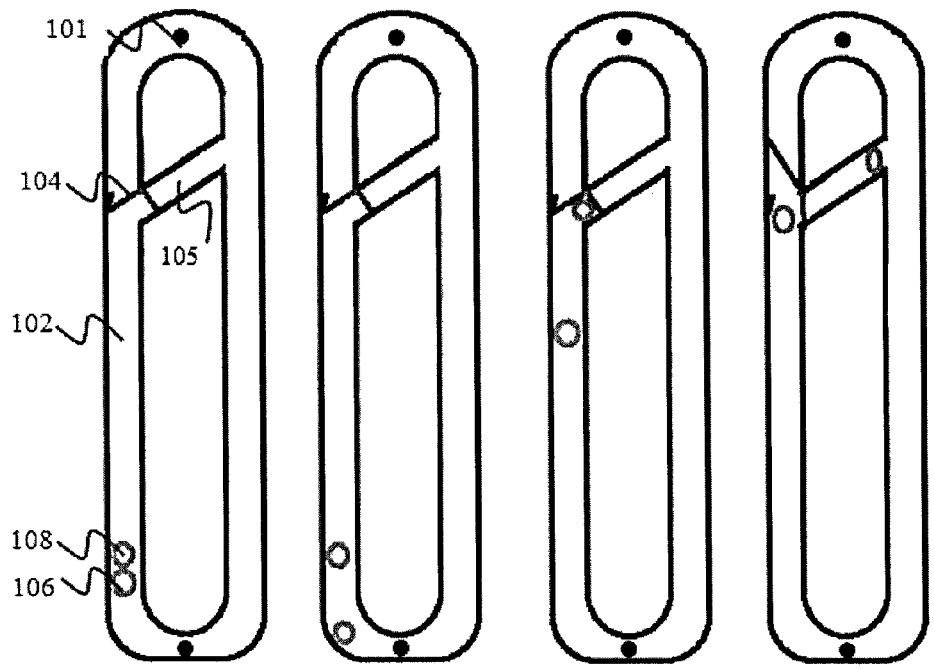
FIGS. 4A-4H illustrate the step by step movements of an inflatable container within a track and component configuration according to one example.
Figures 4E, 4F, 4G, 4H:
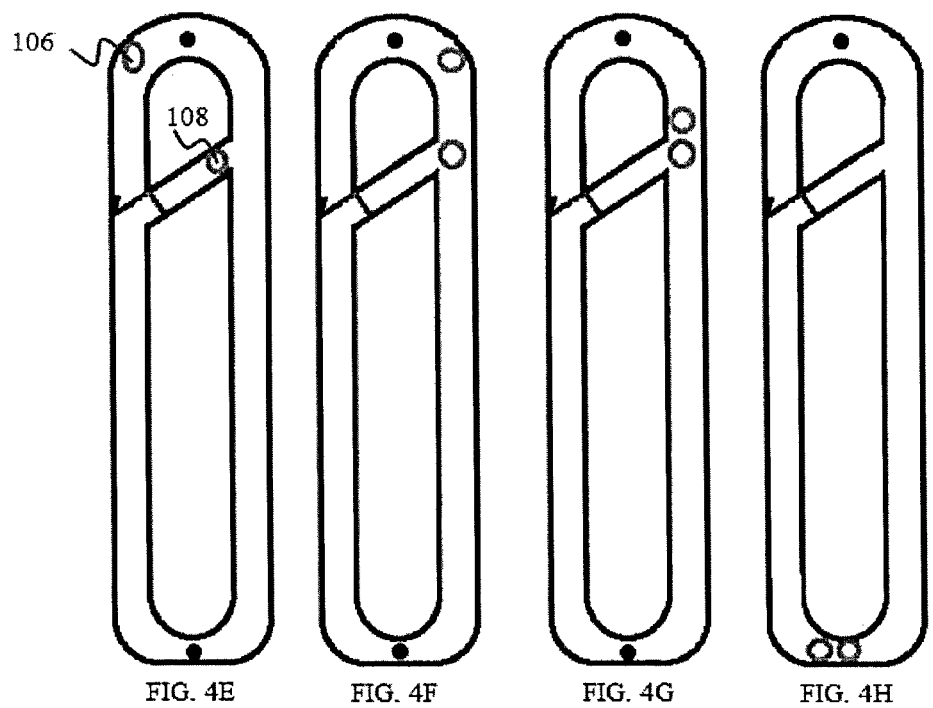

FIG. 4A to 4H illustrate a front view of the embodiment; they depict the track 102, track guide component 104 and the inflatable container 200 connectors 106 and 108. The inflatable container 200 is not shown in the figures so that the connector components 106, 108 that attach to the container 200 are visible. In FIG. 4A the inflatable container 200 is deflated and the connecting components 106 and 108 are rested together at the bottom of the track 102. FIG. 4B shows the two connected components 106 and 108 separated indicating that the inflatable container has been filled with a gas or liquid, either externally via a port connection (not shown) or via the gas cylinder 103 causing the container to rise upwards along the track 102 towards the track guide component 104. FIG. 4C shows how the top container connecting component 108 is guided into the diagonal track 105 as the container 200 raises upwards as described in FIGS. 3A and 3B. FIG. 4D illustrates how component connecter 106 is guided by component 104 to move upwards to the peak 101 of the tower 100 as described in FIGS. 3A and 3B. Between FIGS. 4D and 4E the container 200 rotates at the peak 101 of the track 102 causing the connecting component 106 attached to the heavier portion 206 of the container 200 to move above the other connecting component 108 which is connected to the lighter portion 202 of the container 200. In FIG. 4F the inflatable container 200 has rotated 180 degrees at which point the weight of the heavier portion 206 weighs down on the lighter portion 202 thereby causing the fabric 204 to deflate such that the gas or liquid is release from the container FIG. 4G. In selected embodiments, the gas or liquid may be released via one or both of components 106 and 108 which can act as valves connected to the connecting tubes 109 of FIG. 2B and as described further below. When the gas or liquid is released, the whole of the deflated container 200 is now heavier than the surrounding environment falls towards the bottom of the generator under the force of gravity. This process illustrated from FIG. 4A to 4H is designed to repeat many times with the purpose of generating electricity through kinetic movement.

In selected embodiments, the container is connected to a belt which is connecting to a power generator apparatus, such as a dynamo, as would be understood by one of ordinary skill in the art thereby generating power via the movement of the belt around the track 102. In such an embodiment, at least one of the connecting components 106, 108 of the container 200 would be connected to the belt. For example, connecting component 106 could be connected to the belt while connecting component 108 would be able to move freely along the track 102.

Figures 5A, 5B, 5C:
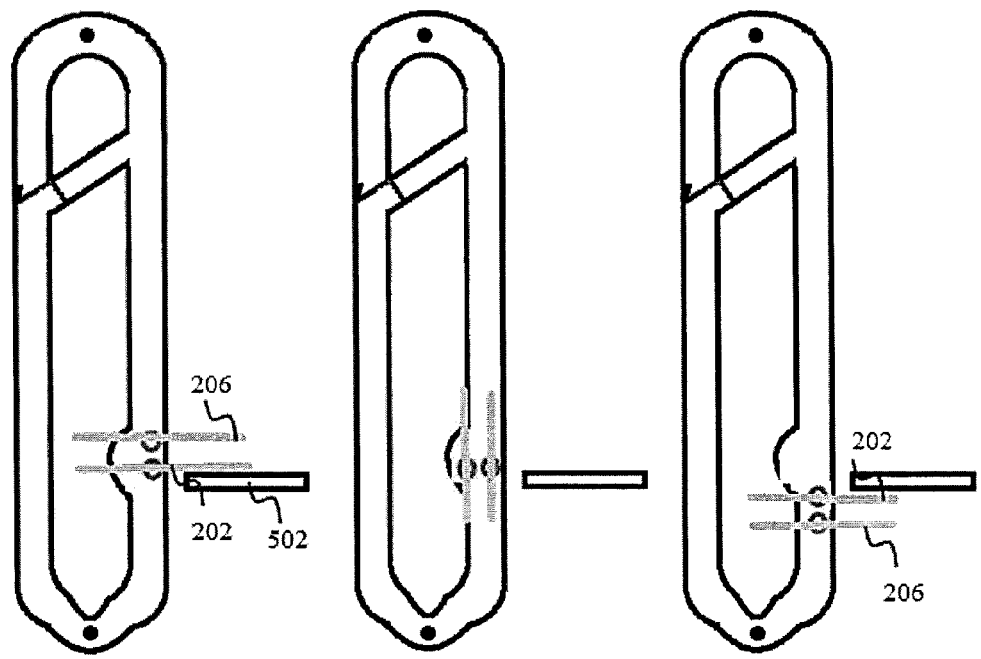
FIGS. 5A-5C illustrate a method of generating power by rotating the inflatable container 180 degrees as it is moving in a downward direction, according to one example.

FIG. 5A to 5C illustrates an alternative configuration for the apparatus where the inflatable container rotates when it drops under the force of gravity. FIG. 5A shows the deflated container 200 coming into contact with an extruding pivot 502 located within and connected to the tower 100 near the track 102. The deflated container 200 collides with the extruding pivot with only half of the container 200 surface causing it to turn as illustrated in FIG. 5B. FIG. 5C shows the deflated container fully rotated as it continues to move in a downward direction under the force of gravity and in response to colliding with the extruding pivot.

Figure 5D:
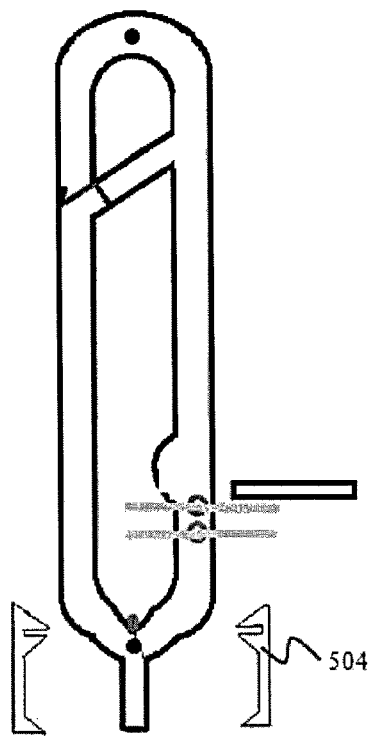
FIGS. 5D-5E demonstrate a method of applying a support and lock component for when the inflatable container is being supplied with gas or liquid, according to one example.
Figure 5E:
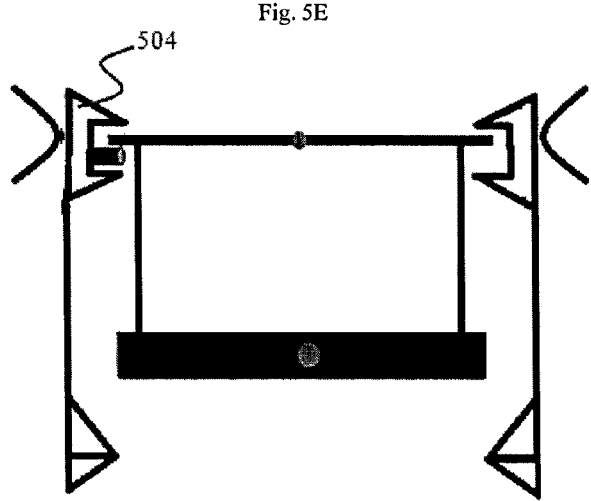

FIG. 5D illustrates the positioning of a mechanism 504 located within and connected to the tower 100 that catches the lighter portion 202 of the container 200 when the inflatable container 200 drops downwards. When the lighter portion 202 is caught in the mechanism 504 the heavier surface 206 continues to fall past the catching component 504 while the lighter portion 202 is held by the catching component 504. The lighter portion 202 may have a larger surface area than the portion surface 206 causing it to be blocked by the catching component 504 while the heavier portion 206 can pass through. As illustrated in FIG. 5E, as the heavier surface 206 falls towards the ground and the light surface is blocked the container 200 produces a suction through the openings of the component 108 causing the container to inflate with gas or liquid drawn from the cylinder 103; as the heavier surface drops downwards a suction reaction draws the gas or liquid into the container 200. When the container is inflated it rises upwards towards the top of the tower 101 to repeat the process over again. In other words, the container 200 can be passed around the bottom of the tower 100 portion of the track 102 in which point it will repeat the previous process. In an alternative embodiment, the container 200 will rise back up the track 102 the way it came from the peak 101 and a diagonal track and component similar to diagonal track 105 and component 104 can be used to force the container 200 to turn 180 degrees at which point it will be deflated and fall towards the start position to generate electricity. At that point, an additional catching component can be installed to catch an inflate the container 200 for another run to generate electricity.

In an alternative embodiment, an electric controller (not shown) can be provided to power the rotation of container 200 around the track back to the starting position at which point a signal can be sent to release gas or liquid into the container 200 from the gas cylinder 203 via the connecting pipes 109. This required amount of electricity is less than the amount generated by the generator and therefore still provides for a net gain in power generation by the system overall.

Figure 6:
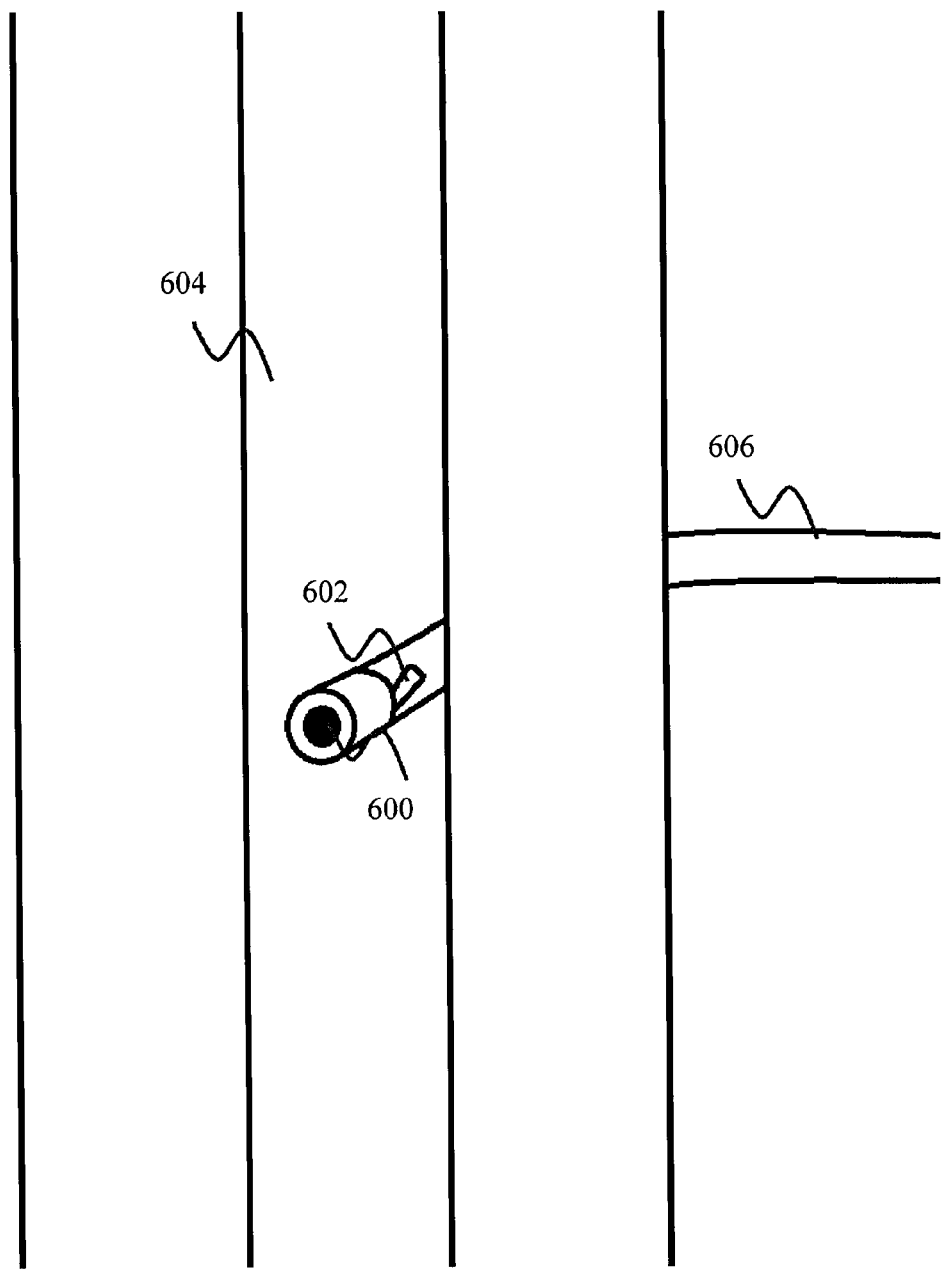
FIG. 6 illustrates a catching component according to one example.

FIG. 6 is an exemplary illustration of the catching component 504 and mechanical switch that opens and closes when pressure is applied and released from the movement of the inflatable container 200. Component 600 is an example of a nozzle that connects to the tubular connecting component 106 and/or component 108 in the inflatable container 200 to transfer gas or liquid when it comes into contact with it. 602 is an exemplary lever mechanism that moves with the passing of the inflatable container 200 along the track 604. As the container 200 reaches the position to transfer the gas or liquid through the connector 106,104 the lever is moved allowing the gas or liquid to pass. The gas or liquid is transferred though a pipe 606, when the container 200 has either filled up or emptied the lever returns back to its original setting closing the pipe 606 and releasing the inflatable container 200.

Figure 7:
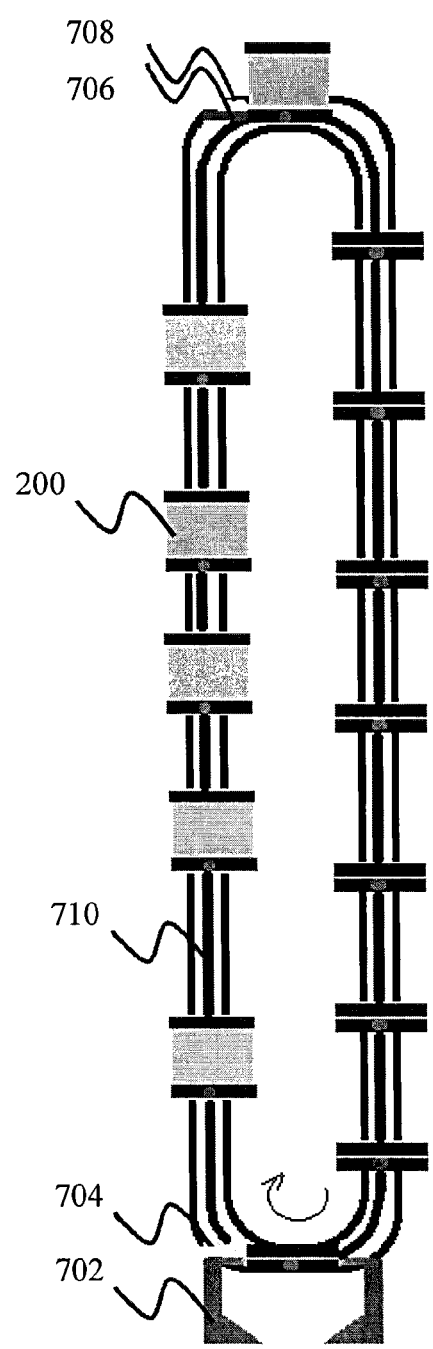
FIG. 7 is an alternative configuration of the apparatus whereby inflatable containers are attached to a belt to drive an energy producing component, according to one example.

FIG. 7 illustrates an alternative configuration for the apparatus where multiple inflatable containers 200 are attached to a conveyer belt 710 at equally spaced intervals and/or other predetermined intervals. When the containers inflate and deflate causing them to move and rotate around the track, they pull along the belt causing it to rotate with the kinetic movement of the containers. The belt is connected to a power generator apparatus, for example a dynamo that enables the rotation movement of the belt to generate power. Having more inflatable containers will create greater force on the belt for it to rotate as they move along the track. The containers inflate with the substance that enables it to move upwards which can be a gas or liquid such as helium, air, hydrogen, water, etc. it does this by moving through a support that positions the deflated container in a support 702. A valve 704 is attached to the support and supplies gas or liquid to the container causing it to inflate. The support 702 can also contain a lock for when the gas or liquid is being inserted into the container, the lock can be configured to work like a latch that releases when the container is fill with air. As the inflated containers raise upwards the weight of the deflated containers cause them to move downwards, the belt continuously rotates to generate power. When the inflated container reaches the highest peak position 101 on the track 102 a support 706 positions the container for a valve 708 to open causing the weight of the upper surface to drop and push the contained gas or liquid contents out from the container. The gas is transferred through a pipe to a deflated container situated at the bottom of the bottom of the track. After the content of the container is released out of it, the deflated container's weight causes it to drop downwards to the support position at the bottom of the track 702 and obtain gas or liquid through the valve 704 and begin the processes cycle over again.

Figure 8:
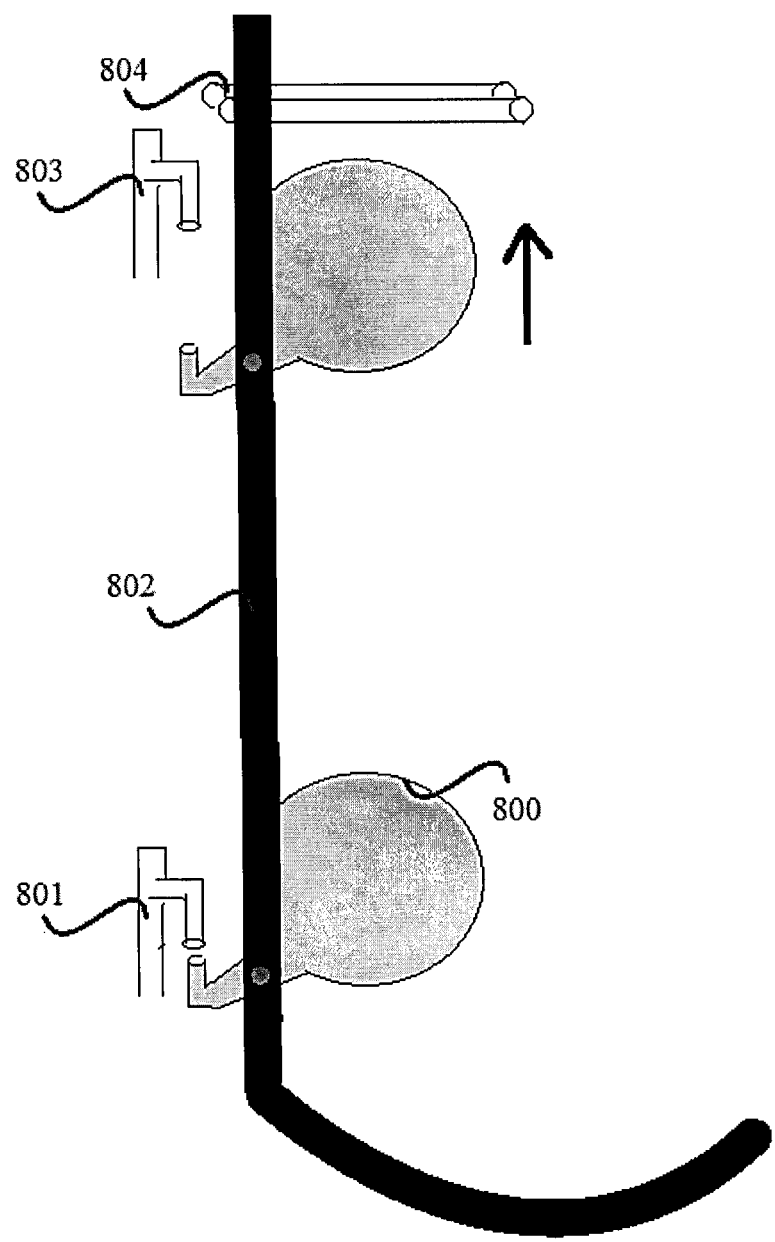
FIG. 8 is a configuration of the apparatus whereby inflatable balloon type containers are attached to a belt to drive an energy producing component, according to one example.

FIG. 8 illustrates an alternative configuration of the apparatus whereby the inflatable container has no solid surface and is made from an inflatable material such as rubber 800. The container 800 is filled up with a gas or liquid substance by a valve 801, the valve is fitted with a mechanism that recognizes that the inflatable container is positioned to be filled. When the valve 801 fills the inflatable container 800, the container raises upwards pulling the belt 802 that drives an electricity producing component. When the inflatable container reaches a peak point on the apparatus, the container attaches to a second valve that 803. As the belt continues to rotate the inflatable container pushes up on two pressing rods 804, the rods force the contents of the container to exit out the valve causing the container to deflate. The deflated container will continue to rotate around the apparatus to the bottom where it will inflate again causing the process to repeat continuously.

Figure 9:
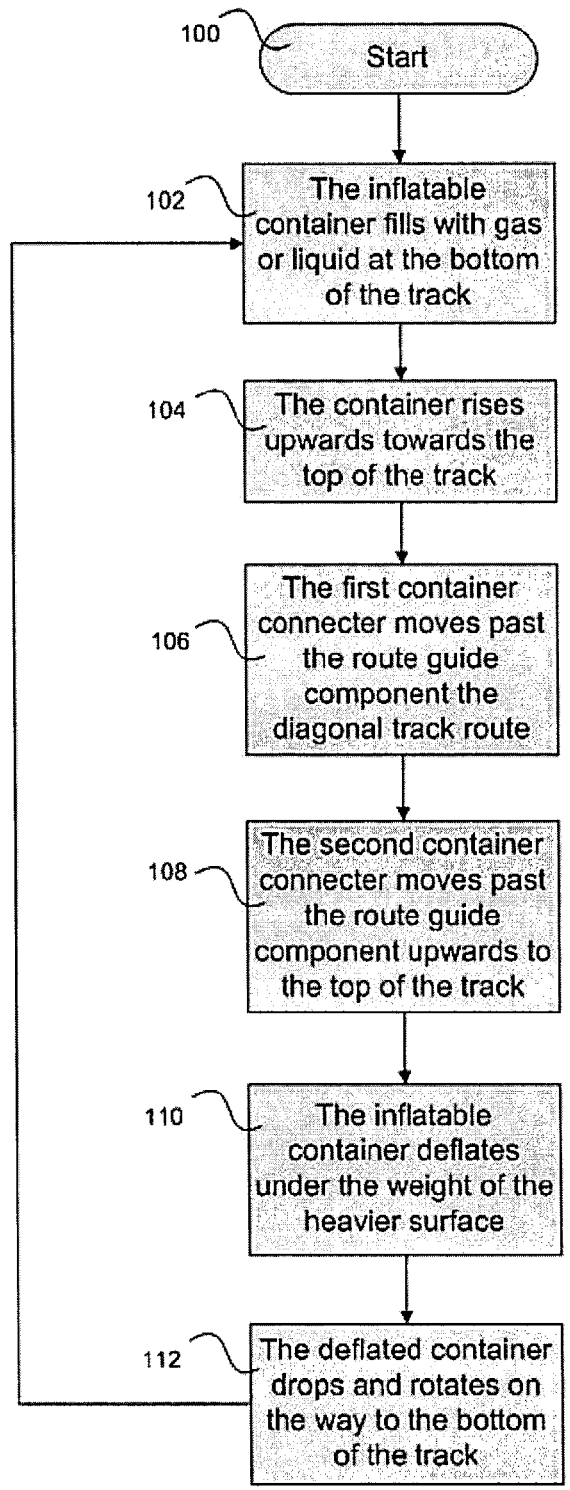
FIG. 9 is a flow chart illustrating the step by step processes of the first configuration of the apparatus illustrated in FIGS. 4A-4H according to one example.

FIG. 9 illustrates a flowchart of the first configuration of the apparatus shown in FIGS. 2 A & B, FIGS. 4A to 4G and 5A to 5F. The power generating apparatus starts with the inflatable container at the bottom of the generator track 102. The container 200 fills up with gas or liquid 102 at the base of the generator where the inflatable container is positioned to be filled with the gas or liquid. When the container fills with the gas or liquid substance it will cause the inflated container to rise upwards along a track 102 guiding the container's two connecters 106, 108 attached to the two surfaces 202, 206 of the inflatable container 200. As the inflated container 200 moves up the guide track 102, the track splits in two directions. A route guide component 104 guides the first connecting component 108 attached to the lighter surface 202 of the inflatable container to a diagonal track 105 causing the inflated container 200 to tilt sideways and move across the apparatus 106. As the first connecter 108 moves across the diagonal track 105, the second connecting component 106 moves upwards along the guide track 102, when it reaches the split in the track, the route guide component 104 guides the second container connecting component 106 along the vertical track 102. The second container connecting component 106 that is attached to the heavier surface of the inflatable container is guided upwards along the track to the top of the apparatus 108. As the heavier surface raises above the lighter surface the gas or liquid contents of the container is released into a valve and the container deflates to bring the two surfaces of the container together while the deflated container moves downwards under the force of gravity 110. The deflated container moves downwards along the track under the force of gravity to position itself in the bottom of the track to inflate again 112.

Figure 10:
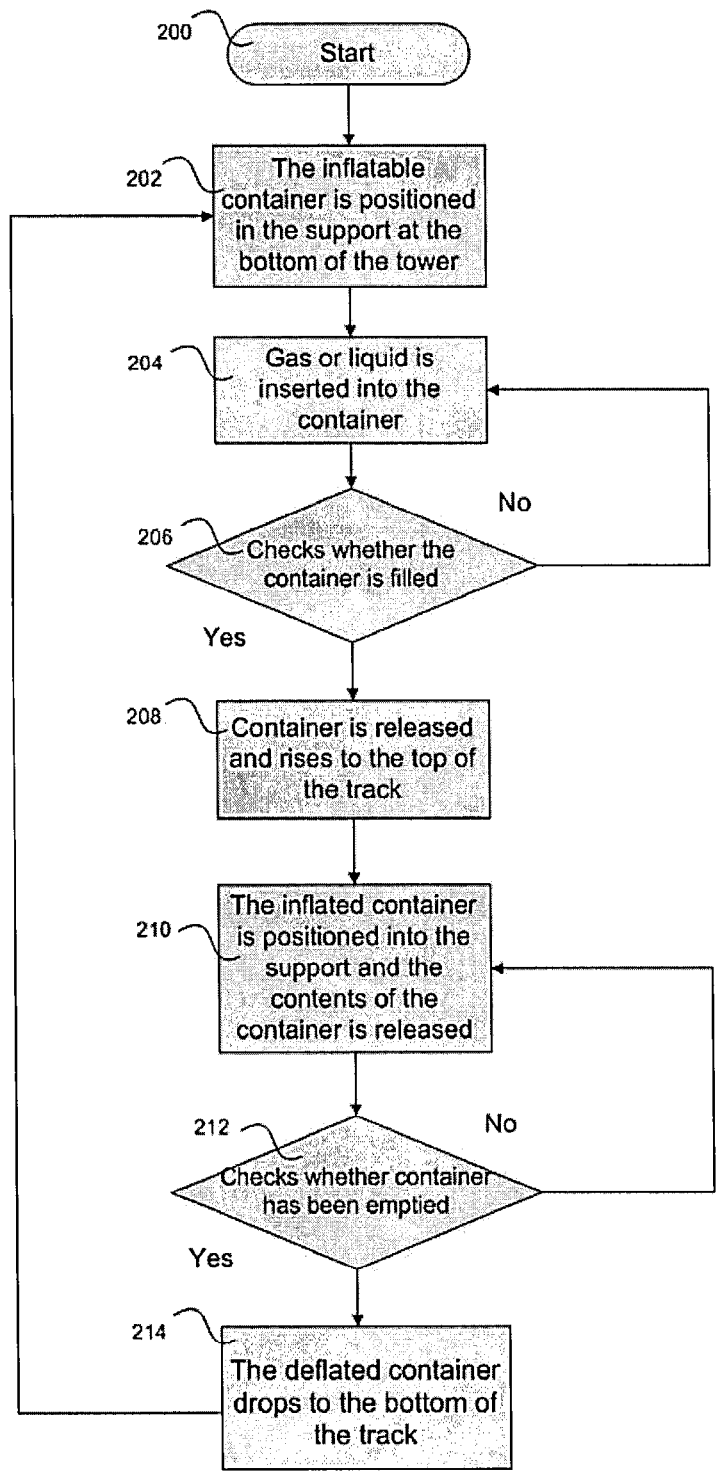
FIG. 10 is a flow chart illustrating the step by step processes of the second configuration of the apparatus illustrated in FIG. 6 according to one example.

The flowchart in FIG. 10 illustrates the mechanical operation depicted in FIG. 6 whereby a container or a number of containers are attached to a belt and rotate along a track as the containers inflate and deflate. The process would typically start with a container being positioned in a support at the bottom of the apparatus 200-202. When the container is positioned in the support, gas or liquid enters the container through a valve and fills up the container causing the container to inflate 204. The support has an integrated mechanical or optionally electrical mechanism that checks if the container is filled 206, this check maybe executed in the form of a mechanical component that moves when the container inflates if the component confirms the container has been filled then a mechanical latch component releases the inflated container 206. The component raises and is guided by the track to the top of apparatus 208, the container that is connected a belt pulls it along to generate power through a rotational kinetic movement. When the inflated container reaches the top of the apparatus, it reaches a position support where trigger enables the contents of the container to release though a valve 210. A mechanical or an optional electrical mechanism detects whether the container has emptied 212, when the detector is triggered by the deflation of the container it is released and the container drops downwards under the force of gravity to the base of the apparatus 214.

The apparatus is not limited to any type of gas or liquid; but can be any gas or liquid that is lighter than the outside environment. For example helium is lighter than air which could work for an 'outside' configuration, or the apparatus can be configured to work underwater where air fills up the containers under water which makes them rise to the surface when they inflate. This process would require a configuration whereby the weight between the surfaces that pull the deflated container downwards should be balanced with the force that propels the inflated container upwards. All containers movement may require calculated synchronization in order to produce fluid movement of the belt. The containers mass and capacity should be adjustable to balance the upward and downward forces of the apparatus when in operation. Also pressure on the moving components should be minimalized to minimize friction when the apparatus is in operation and the moving components should be adjustable to enable calibration of the apparatus. Calibration properties may include timing of inflation and deflation of the containers, the amount of gas or liquid that can be stored in them, the size and weight of each container, the positioning of each container along the belt, the length of the track, etc.

The concept of this apparatus can be reversed to configure the container movement to be based on the contents inside of the container to be heavier than the environment outside of it. Instead of the container being filled at the bottom of the apparatus with a substance lighter than the environment outside of it to cause it to move upwards, the container can be filled at the top of the apparatus with a substance heavier than the environment outside of it forcing it to accelerate downwards.

An important aspect on the apparatus is that it is able to function independently without power to produce power. The configuration of the components should enable the apparatus to mechanically function autonomously without any human or electrical circuit assistance. The apparatus can function in multiple environments on land or underwater and can accommodate a variety of substances inside of the container. The apparatus configuration is versatile and adaptable.

What is claimed is:
1. A gravitational energy powered generator comprising:
a tower having a track therein;
a conveyer belt connected to and provided within the tower in the shape of the track;

a container having a plurality of housings, wherein at least one of the housings is heavier than at least one other housing and two of the housings each include a connecting component, at least one of the connecting components being connected to the belt within the track;

a first port located at the bottom of the tower to receive gas from an external source and provide the gas to one of the housings via at least one of the connecting components to inflate the container thereby causing the container to rise;

a first trigger mechanism configured to enable the first port to provide gas to the container based on the positioning of the container at the bottom of the track;

a second port located near a peak of the tower to receive gas from one of the housings via at least one of the connecting components to deflate the container thereby causing the container to fall;

a second trigger mechanism configured to extract the gas from the container via one of the connecting components based on the positioning of the container near the peak of the track; and an electrical generating apparatus that harnesses the movement of the belt via the container and converts it to electricity, wherein the track includes multiple paths to guide the container within the tower, the multiple paths provided such that the container rotates 180 degrees when passing the peak of the tower.

2. The gravitational energy powered generator of claim 1, wherein the container includes a first housing, second housing and third housing, the first housing is heavier than the second and third housing, and the second housing is made of a hollow flexible material and receives the gas from the first port via at least one of the connecting components.

3. The gravitational energy powered generator of claim 2, wherein the width of the third housing is larger than the width of the first and second housing.

4. The gravitational energy powered generator of claim 1, further comprising:

a plurality of containers, wherein the belt is located along the track and includes connections at equally spaced intervals to connect to each container to guide each container along the track.

5. The gravitational energy powered generator of claim 2, wherein the first housing contains a connecting component and the third housing contains a connecting component, and only the connecting component of the third housing is attached to the belt.

6. The gravitational powered energy generator of claim 1, wherein the external source is a gas cylinder connected to the tower via a first connecting tube and a second connecting tube, one end of the first connecting tube is connected to the gas cylinder and the other end of the first connecting tube is connected to the first port, and one end of the second connecting tube is connected to the gas cylinder and the other end of the second connecting tube is connected to the second port.

7. The gravitational energy powered generator of claim 1, wherein the inflatable container can travel upwards and downwards along the track without the need for assisting electrical components.

8. The gravitational energy powered generator of claim 1, wherein the track is an elliptical track.

9. The gravitational energy powered generator of claim 1, wherein the gas supplied to the container has a lighter mass than the mass of the environment outside of the container.

10. The gravitational energy powered generator of claim 1, wherein the track provides a first elliptical path and a second path connecting opposite sides of the elliptical path, and the gravitational energy powered generator further comprises:

a track guide component located at a connection point between the first elliptical path and the second path, the track guide component guiding one connecting component along the first elliptical path and guiding one connecting component along the second path.

11. The gravitational energy powered generator of claim 10, wherein the track guide component is shaped with three ends and contains a center rod about which a circular component can rotate about the center rod to provide guidance for the connecting components until the circular component is stopped by a pivot component.

12. A gravitational energy powered generator comprising:

a tower having an elliptical track therein;

a conveyer belt connected to and provided within the tower in the shape of the elliptical track;

a container having a plurality of housings, wherein at least one of the housings is heavier than at least one other housing and two of the housings each include a connecting component, at least one of the connecting components being connected the belt within the track;

a first port located at the bottom of the tower to receive gas from an external source and provide the gas to one of the housings via at least one of the connecting components to inflate the container thereby causing the container to rise;

a second port located near a peak of the tower to receive gas from one of the housings via at least one of the connecting components to deflate the container thereby causing the container to fall; and an electrical generating apparatus that harnesses the movement of the belt via the container and converts it to electricity, wherein the track includes multiple paths to guide the container within the tower, the multiple paths provided such that the container rotates 180 degrees when passing the peak of the tower, the container includes a first housing, second housing, and third housing, the first housing is heavier than the second and third housing, and the second housing is made of a hollow flexible material and receives the gas from the first port, the track provides a first elliptical path and a second path connecting opposite sides of the elliptical path, and the gravitational energy powered generator further comprises:

a track guide component located at a connection point between the first elliptical path and the second path, the track guide component guiding one connecting component along the first elliptical path and guiding another connecting component along the second path.

* * * * *